(12) United States Patent
Shevket

(10) Patent No.: US 7,104,695 B2
(45) Date of Patent: Sep. 12, 2006

(54) ASYMMETRIC HUB ASSEMBLY

(75) Inventor: Cengiz R. Shevket, Novi, MI (US)

(73) Assignee: Aktiebolaget SKF, (SE)

( * ) Notice: Subject to any disclaimer, the term of this patent is extended or adjusted under 35 U.S.C. 154(b) by 23 days.

(21) Appl. No.: 10/964,013

(22) Filed: Oct. 13, 2004

(65) Prior Publication Data

US 2005/0111771 A1    May 26, 2005

Related U.S. Application Data

(60) Provisional application No. 60/511,004, filed on Oct. 14, 2003.

(51) Int. Cl.
*F16C 19/08* (2006.01)

(52) U.S. Cl. .................. 384/450; 384/544; 384/589; 384/516

(58) Field of Classification Search ........... 384/450, 384/544, 545, 589, 516, 569
See application file for complete search history.

(56) References Cited

U.S. PATENT DOCUMENTS

| | | | |
|---|---|---|---|
| 4,958,944 A * | 9/1990 | Hofmann et al. | 384/512 |
| 6,146,022 A * | 11/2000 | Sahashi et al. | 384/544 |
| 6,857,786 B1 * | 2/2005 | Csik | 384/589 |

* cited by examiner

*Primary Examiner*—Lenard A. Footland
(74) *Attorney, Agent, or Firm*—Eugene E. Renz, Jr.

(57) ABSTRACT

A hub bearing assembly comprising a hub having a radially outwardly directed flange at one axial end for mounting the wheel of a vehicle, an outer ring having axially spaced raceways and a plurality of rolling elements arranged in two rows in the annular space between the outer ring and the hub, the diameter of the pitch circle of the outboard row of rolling elements adjacent said flange being greater than the diameter of the pitch circle of the rolling elements in the inboard row.

4 Claims, 5 Drawing Sheets

ASYMMETRIC HUB ASSEMBLY

This application claims the benefit of U.S. Provisional Application Ser. No. 60/511,004 filed Oct. 14, 2003.

FIELD OF THE INVENTION

The present invention relates to improvements in hub units for vehicles and more specifically to a novel asymmetric bearing arrangement for rotatably supporting a wheel of a vehicle.

BACKGROUND OF THE INVENTION

Hub units for vehicle wheels are not new per se. Typical of the prior are units are shown in patents such as the OSHIAKI, U.S. Pat. No. 6,036,371 for ROLLING BEARING UNIT FOR VEHICLE WHEEL issued Mar. 14, 2000 and the Evans, U.S. Pat. No. 4,333,695 for ROLLING BEARING issued Jan. 8, 1982. As shown in these patents, the hub units typically comprise a generally cylindrical hub having a radially outwardly directed flange for mounting to a wheel of a vehicle via a series of circumferentially spaced bolt holes accommodating lugs or studs for supporting the wheel. A pair of axially spaced rows of bearings support the wheel for rotation between an outer ring having internal raceways for the rolling elements. In the Yoshiaki '371 patent, the bearing support comprises a row of balls and a row of tapered rollers.

Even though these hub assemblies are generally satisfactory for the intended purpose, the present invention is an improvement in hub assemblies of this general type and is characterized by novel features of construction and arrangement providing functional advantages over the prior art such as a more balanced load distribution on the bearings and what is termed a "stiffer" hub reducing bending moments particularly beneficial in cornering maneuvers.

SUMMARY OF THE INVENTION

The present invention provides an asymmetric unit wherein the diameter of the pitch circle of the bearing in the outboard row adjacent the radial flange of the hub is of a greater diameter than the diameter of the pitch circle of the bearing at the inboard end. In a preferred embodiment of the invention, the inner and outer rows of the bearings are angular contact ball bearings and the diameter of the row at the outboard or wheel end is preferably at least five mm greater than the diameter of the pitch circle of the row at the inner suspension end. By this arrangement the distance between the pressure centers where the contact angle of the two bearing rows intercept the axis of the hub can be maximized to provide high camber stiffness. Further the outboard row preferably intercepts the hub axis outboard of the hub flange which balances the loads on the system more evenly between the inner and outer bearing rows. Additionally, by reason of the asymmetric design, the outboard row can accommodate more balls and thereby increase the capacity of the bearing without changing the package geometry. With this design, the outboard pressure center can be placed further outboard than a symmetrical unit without having to increase the contact angle and reducing bearing radial dynamic capacity.

In other words, comparing the symmetrical ball units of the prior art with the asymmetrical unit of the present invention, the asymmetric arrangement provides more capacity without impacting the knuckle or axial flange geometry. Thus bearing designers can utilize ball bearings in applications which would normally require tapered bearings thus providing an economy without jeopardizing performance.

As noted above, increasing hub stiffness by the asymmetric design improves noise and vibration harshness, enhances steering accuracy and vehicle dynamic behavior and also improves brake wear due to true running of the rotors.

With the enhanced stiffness of the asymmetrical design, the hub unit can accommodate large diameter wheels which apply a heavier bending moment on the hubs. The asymmetric designs allows wheel size increases without any changes in the hub design.

In summary, the present invention improves hub flange strength and increases robustness and enhances safety of hubs.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF PREFERRED EMBODIMENTS

Figure 1:
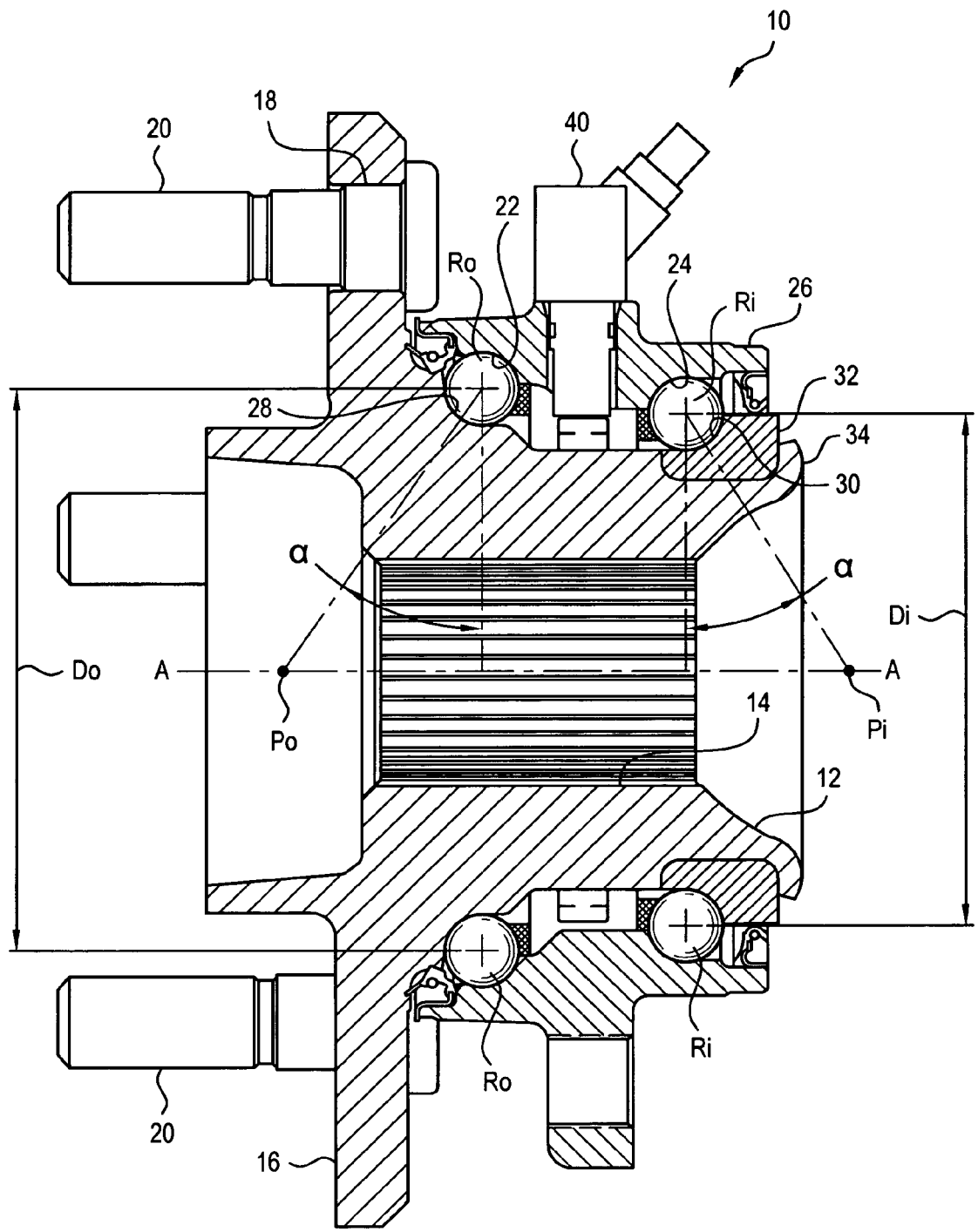
FIG. 1. is a transverse sectional view of an asymmetric hub assembly in accordance with the present invention.

Referring now to the drawings and particularly to FIG. 1 thereof, there is shown an asymmetric hub assembly in accordance with the present invention generally designated by the numeral (10). The hub assembly (10) includes an elongated hub (12) having a splined center opening running axially of the hub (12) and having at its outboard or wheel end a circumferentially extending radially outwardly directed flange (16) having a series of circumferentially spaced holes (18) to mount a wheel of a vehicle by means of studs (20).

The hub assembly (10) has an outboard and an inboard row of the ball bearings, Ro, Ri which ride on outer raceways (22), (24) of an outer ring (26). The inner raceway (28) for the outboard row Ro is formed integrally with the hub (12) and the inner raceway (30) for the inboard row of ball bearings Ri is formed on a annular insert (32) held in place after assembly of the balls in the two rows Ro, Ri by a circumferentially extending lip (34) at the inner axial end of the hub (12). Conventional seals S are provided at the opposing axial ends of the annular space between the hub (12) and the outer ring (26). Further, the outer ring (26) has means (27) at its inboard or suspension end for securing it to a frame or steering mechanism of a vehicle. A sensor (38)

is also mounted in the outer ring (26) which confronts a sensing ring (40) on the hub to measure speed of rotation in the conventional way.

The present invention is characterized by novel features of construction and arrangement providing an asymmetric bearing which has functional advantages over the prior art. To this end, the diameter D of the pitch circle of the outboard row of balls Ro is preferably greater than the diameter Di of the pitch circle of the inboard row of balls Ri. The difference in the diameters Do, Di is preferably at least five (5) mm. Further, the contact angle α of the bearings intersect the rotational axis A—A of the hub at points defined herein as pressure centers Po, Pi. The pressure centers Po, Pi lie outside the flange (16) at the outboard end of the hub assembly and at the inboard end as well to provide enhanced performance such as higher load carrying capability and better distribution of the load on the bearings Ro, Ri.

Figure 3:
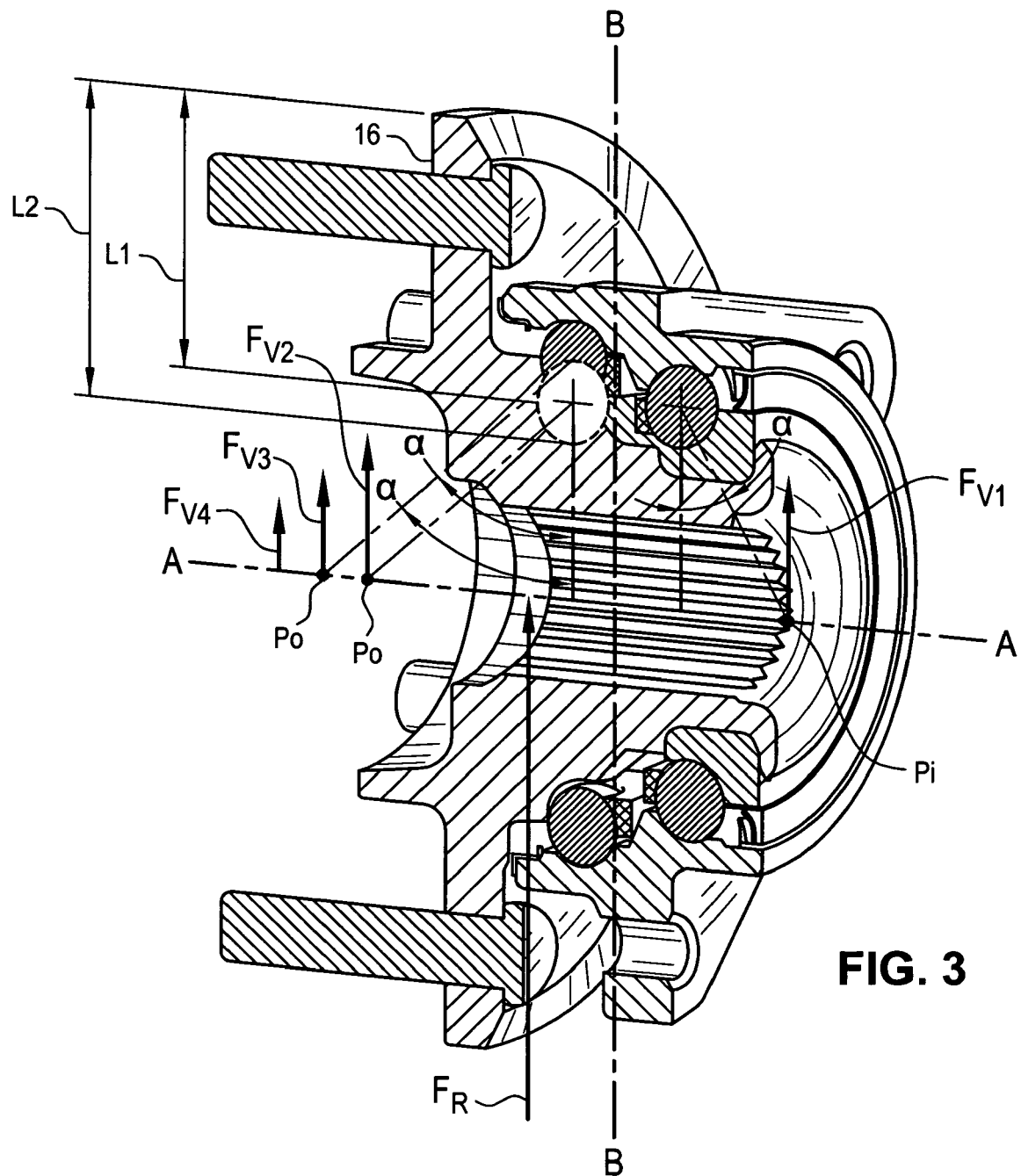
FIG. 3. is a transverse sectional view of an asymmetric hub in accordance with the present invention showing balancing the loads and a reduction in the radial load component on the outer row as compared to the prior art symmetric arrangement.
Figure 4:
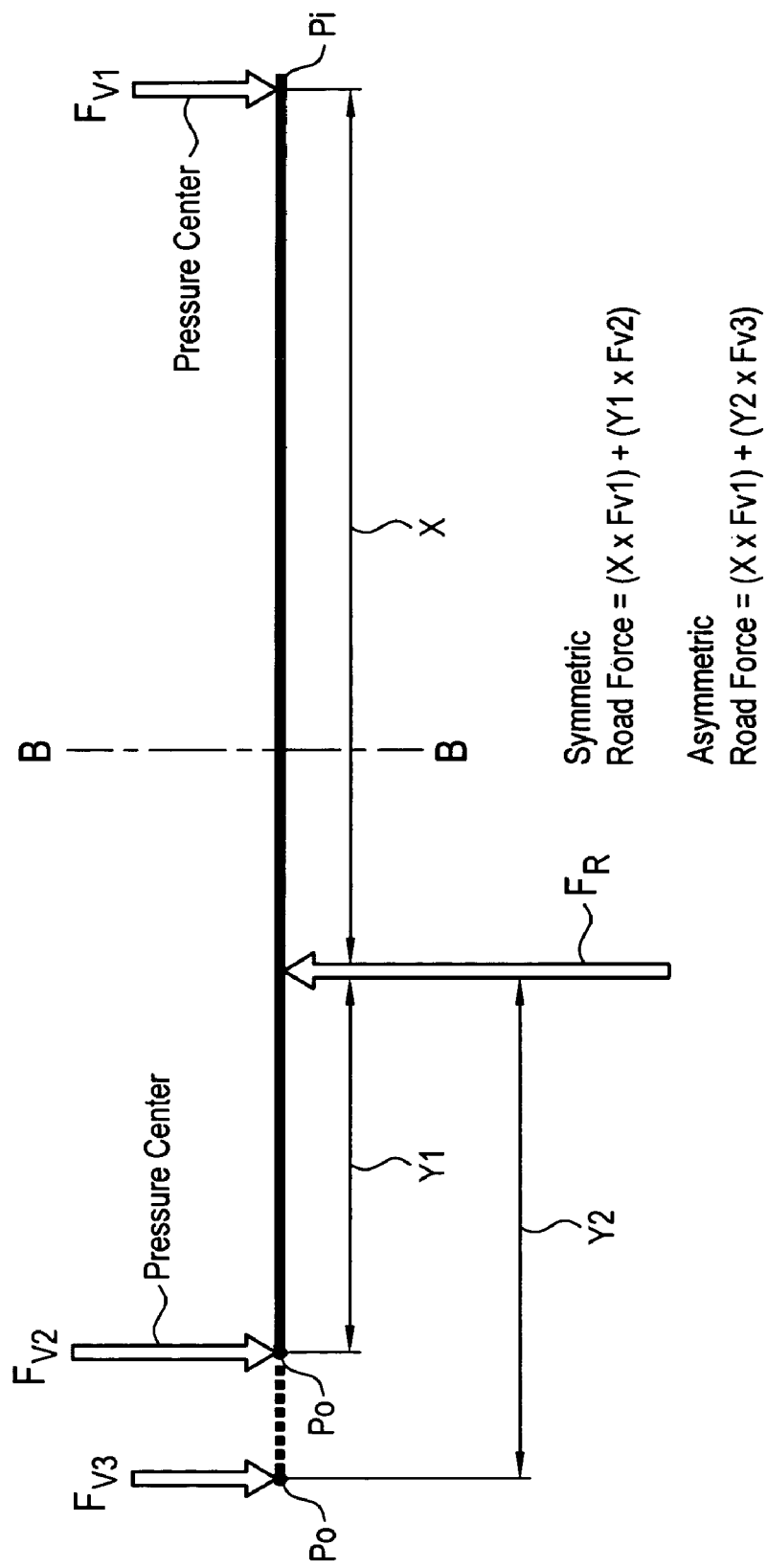
FIG. 4. is a free body diagram comparing load distribution for symmetric prior art system and the asymmetric hub assembly of the present invention.

FIG. 3 illustrates how road forces act on the pressure centers Po, Pi of an angular contact ball hub unit in accordance with the present invention to provide improved load distribution on the bearings Ro, Ri and also to reduce the bending moment arm on the outboard flange (16) of the assembly.

As illustrated in FIG. 3, for a bearing arrangement wherein the pitch diameters of the inner and outer rows Ri, Ro are the same the load force Fr from the road tire interface is acting outboard of the geometric center B—B of the bearing. Accordingly, the distance from the point of application of the force Fr at the bearing axis A—A to the outboard pressure center Po is a shorter distance than the distance to the inboard pressure center Pi and therefore the magnitude of the vertical force Fv2 acting on the outboard row of the outboard bearing Ro will be larger than that of the inboard force Fv1 based on a simple beam theory. By increasing the pitch circle diameter Do of the outboard bearing Ro without changing the contact angle ∝ as illustrated in FIG. 3, the distance to the force Fv3 is increased thereby producing a reduction of the magnitude of this force. Increasing the outboard pitch circle diameter Do provides more room or space between each of the balls so that the diameter increase of the outboard row of balls Ro produces a two fold improvement in life expectancy on the outer row Ro and additional load carrying capacity by more rolling elements and a more balanced load distribution between the bearings Ro, Ri. In most instances, the overall geometry of the assembly is not impacted by increasing the pitch diameter Do of the outboard row Ro of rolling elements since there is more radial space on the outboard side of the bearing than on the inboard side mainly due to the knuckle and brake geometry.

Figure 5:
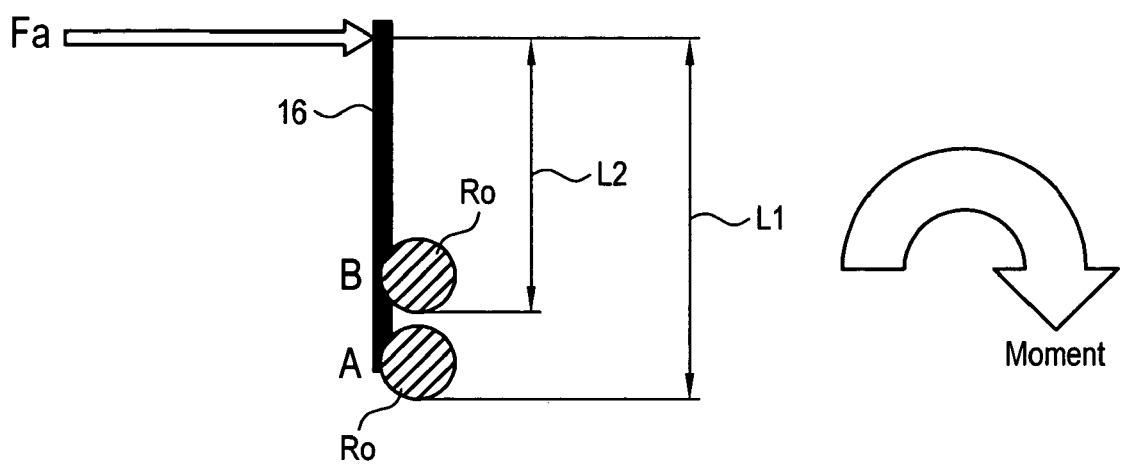
FIG. 5. is a free body diagram comparing bending moment of asymmetric hub design of the present invention verses prior art asymmetric systems.

FIG. 5 is a free body diagram showing effect of the lateral road force Fa under cornering conditions on the bending moment acting on the hub assembly. As can be seen in FIG. 5, the moment arm $L_1$ of a symmetric arrangement is greater than the moment arm $L_2$ of the asymmetric arrangement and by reason of this difference, the moments about A which is a product of Fa×$L_1$ is greater than the moment about B which is Fa×$L_2$. Therefore, by reason of the moment arm differential, the effective moment on the symmetric is higher and thus the hub flange will yield more and adversely effect the "stiffness" of the hub assembly.

Figure 2:
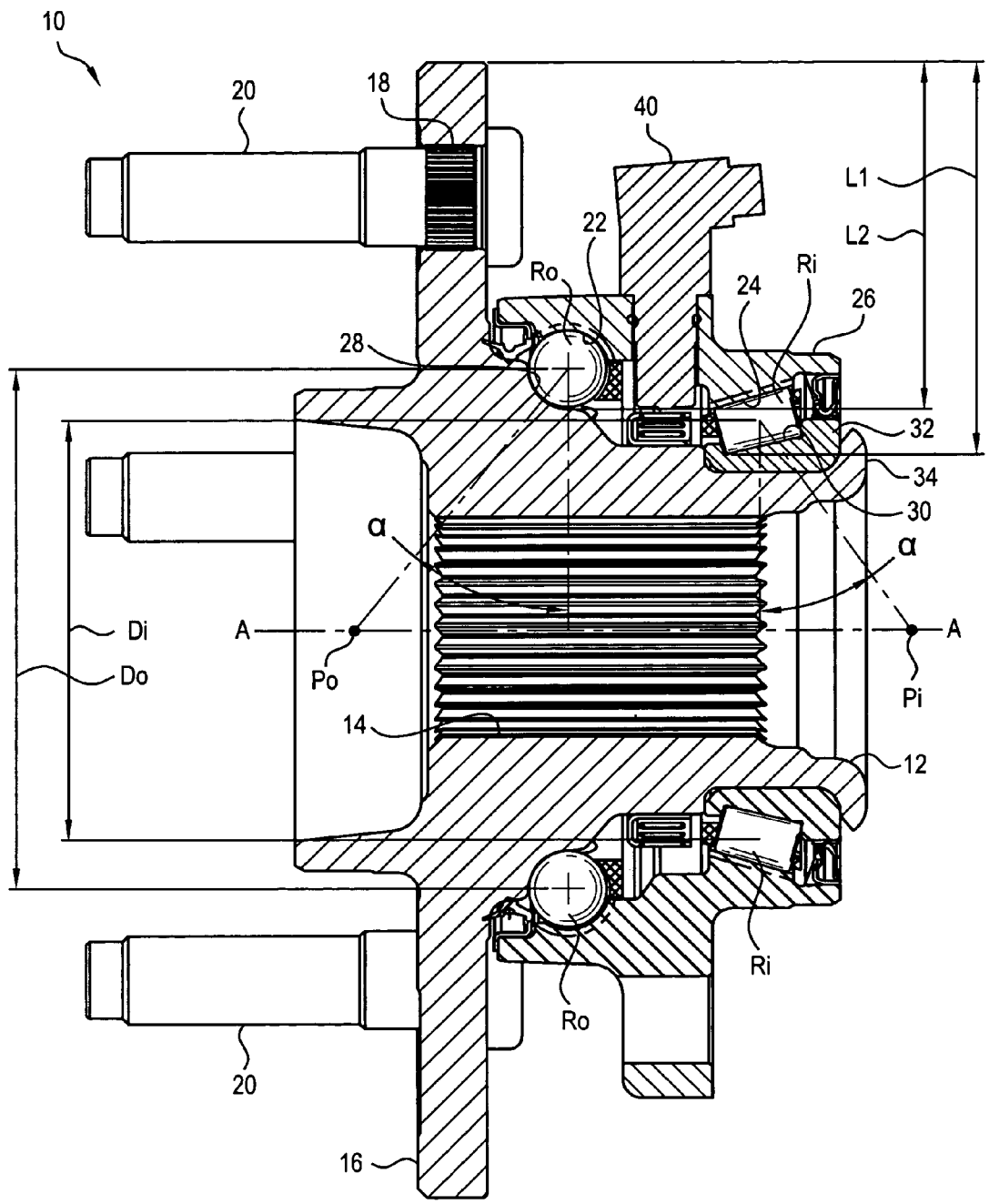
FIG. 2. is a transverse sectional view of another embodiment of asymmetric hub assembly in accordance with the present invention.

A modified embodiment of asymmetric hub assembly in accordance with the present invention is shown in FIG. 2. The hub assembly generally designated by the numeral 10$a$ is the same in terms of components except in this instance, the inboard bearing Ri is a tapered roller bearing and is used in applications where the predominant load is radial this arrangement can be used where an existing taper roller bearing needs to be replaced without having to change the knuckle diameter.

The invention provides improved performance in predominantly radial load conditions such as in heavy truck applications which typically utilize tapered rollers. The bearings incorporate the same offset relationship of the inner and outer rows Ri, Ro as described above and the intersection of the contact angle α is preferably outward of the axial end of the hub. The preferred asymmetric design utilizing balls in the outboard row Ro provides hub stiffness and structural strength improvement without sacrificing load carrying capacity.

As noted above, in the symmetric design, the magnitude of the vertical force acting on the outboard row designated $F_{v2}$ is larger than the force $F_{v1}$ on the inboard side which lowers life expectancy of the outboard row Ro. By increasing the pitch circle diameter to produce an asymmetric design, the beneficial effects are many fold even without a change of the contact angle α. As illustrated in FIG. 3, the magnitude of the force is reduced ($F_{v3}$), more room is created to accommodate more balls further improving life expectancy and producing further force reduction $F_{v4}$.

In summary, benefits of the asymmetric design include high camber stiffness providing improved brake wear, better driving precision, optimized bearing capacity and life expectancy.

Even though particular embodiments of the present invention have been illustrated and described herein, it is not intended to limit the invention and changes and modifications may be made therein within the scope of the following claims.

What is claimed is:

1. A hub bearing assembly comprising a hub having a radially outwardly directed flange at one axial end for mounting the wheel of a vehicle, an outer ring having axially spaced raceways and a plurality of rolling elements arranged in two rows in the annular space between the outer ring and the hub, the diameter of the pitch circle of the outboard row of rolling elements adjacent said flange being greater than the diameter of the pitch circle of the rolling elements in the inboard row.

2. A hub bearing assembly as claimed in claim 1 wherein the rolling elements of both rows are balls.

3. A hub assembly as claimed in claim 1 wherein the rolling elements of said outboard row are balls and the rolling elements of the other inboard row are tapered rollers.

4. A hub assembly as claimed in claim 1 wherein the diameter of the pitch circle of said outer row is at least five mm greater than the diameter of the pitch circle of the inboard row of rolling elements.

* * * * *

(12) EX PARTE REEXAMINATION CERTIFICATE (6520th)
United States Patent
Shevket

(10) Number: US 7,104,695 C1
(45) Certificate Issued: Nov. 11, 2008

(54) ASYMMETRIC HUB ASSEMBLY

(75) Inventor: Cengiz R. Shevket, Novi, MI (US)

(73) Assignee: Aktiebolaget SKF, Gothenburg (SE)

Reexamination Request:
No. 90/008,400, Jan. 31, 2007

Reexamination Certificate for:
Patent No.: 7,104,695
Issued: Sep. 12, 2006
Appl. No.: 10/964,013
Filed: Oct. 13, 2004

Related U.S. Application Data
(60) Provisional application No. 60/511,004, filed on Oct. 14, 2003.

(51) Int. Cl.
*F16C 19/08* (2006.01)

(52) U.S. Cl. .................. 384/450; 384/544; 384/589; 384/516

(58) Field of Classification Search .......... 384/544, 384/504, 512, 505, 506, 589, 571
See application file for complete search history.

(56) References Cited

U.S. PATENT DOCUMENTS

| | | | |
|---|---|---|---|
| 3,583,511 A | | 6/1971 | Asberg |
| 4,248,487 A | | 2/1981 | Asberg |
| 4,333,695 A | * | 6/1982 | Evans .......................... 384/562 |
| 5,494,358 A | * | 2/1996 | Dougherty .................. 384/448 |
| 5,736,853 A | | 4/1998 | Rigaux |
| 5,875,550 A | | 3/1999 | Kohn |
| 6,024,417 A | | 2/2000 | Jones et al. |
| 6,036,371 A | | 3/2000 | Onose |
| 6,196,639 B1 | * | 3/2001 | Di Ponio et al. ......... 301/105.1 |
| 6,290,048 B1 | | 9/2001 | Kohlmeier et al. |
| 2005/0018937 A1 | | 1/2005 | Lagorgette |
| 2005/0031240 A1 | | 2/2005 | Dodoro et al. |

FOREIGN PATENT DOCUMENTS

| | | |
|---|---|---|
| DE | 102004018900 A1 | 11/2005 |
| EP | 733494 A2 | 9/1991 |
| GB | 2007201 A | 5/1979 |
| JP | 57-6125 | 1/1982 |
| JP | 0518813 A | 7/1993 |
| JP | 11091309 A | 4/1999 |
| JP | 2004-108449 A | 8/2004 |
| WO | WO 99 41118 A1 | 8/1999 |

OTHER PUBLICATIONS

Product Catalog of Nachi Automobile Wheel Bearing (K. K. Fujikoshi) (Feb. 2003).
SKF Hub Design Brochure (1989).
New Departure Handbook (1945).
Marks Mechanical Engineers Handbook (1930).

\* cited by examiner

*Primary Examiner*—David O. Reip

(57) ABSTRACT

A hub bearing assembly comprising a hub having a radially outwardly directed flange at one axial end for mounting the wheel of a vehicle, an outer ring having axially spaced raceways and a plurality of rolling elements arranged in two rows in the annular space between the outer ring and the hub, the diameter of the pitch circle of the outboard row of rolling elements adjacent said flange being greater than the diameter of the pitch circle of the rolling elements in the inboard row.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 5–10 are added and determined to be patentable.

*5. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) wherein the contact angles of the inner and outer rows of rolling elements intersect the rotational axis (A—A) of the hub (12) at pressure centers (Pi, Po) which lie outside the flange (16) at the outboard end of the hub assembly and outside the hub (12) at the inboard side to define a wide pressure base between the pressure centers (Pi, Po) providing higher moment stiffness, better distribution of the load on the bearings and reducing the moment acting on the flange (16).*

*6. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) wherein the contact angles of the inner and outer rows of rolling elements intersect the rotational axis (A-A) of the hub (12) at pressure centers (Pi, Po) to define a wide pressure base between the pressure centers (Pi, Po) and wherein the diameter (Do) of the pitch circle of said outer row (Ro) is at least five mm greater than the diameter (Di) of the pitch circle of the inboard row (Ri) of rolling elements providing higher moment stiffness, better distribution of the load on the bearings and reducing the moment acting on the flange (16).*

*7. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) wherein the contact angle of the outer row of rolling elements intersects the rotational axis (A—A) of the hub (12) at a pressure center (Po) which lies outside the flange (16) at the outboard end of the hub assembly to define a wide pressure base between the pressure centers (Pi, Po) providing higher moment stiffness, better distribution of the load on the bearings and reducing the moment acting on the flange (16).*

*8. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) wherein the contact angle of the outer row of rolling elements intersect the rotational axis (A—A) of the hub (12) at a pressure center (Po) which lies outside the flange (16) at the outboard end of the hub assembly to define a wide pressure base between the pressure centers (Pi, Po) and wherein the diameter (Do) of the pitch circle of said outer row (Ro) is at least five mm greater than the diameter (Di) of the pitch circle of the inboard row (Ri) of rolling elements providing higher moment stiffness, better distribution of the load on the bearings and reducing the moment acting on the flange (16).*

*9. A hub bearing assembly as claimed in claim 6 wherein the rolling elements of both rows (Ri, Ro) are balls.*

*10. A hub bearing assembly as claimed in claim 6 wherein the rolling elements of said outboard row (Ro) are balls and the rolling elements of said inboard row (Ri) are tapered rollers.*

\* \* \* \* \*

(12) EX PARTE REEXAMINATION CERTIFICATE (8503rd)
United States Patent
Shevket

(10) Number: US 7,104,695 C2
(45) Certificate Issued: Aug. 30, 2011

(54) ASYMMETRIC HUB ASSEMBLY

(76) Inventor: Cengiz R. Shevket, Novi, MI (US)

Reexamination Request:
No. 90/009,725, Jun. 10, 2010

Reexamination Certificate for:
Patent No.: 7,104,695
Issued: Sep. 12, 2006
Appl. No.: 10/964,013
Filed: Oct. 13, 2004

Reexamination Certificate C1 7,104,695 issued Nov. 11, 2008

Related U.S. Application Data
(60) Provisional application No. 60/511,004, filed on Oct. 14, 2003.

(51) Int. Cl.
*F16C 19/08* (2006.01)

(52) U.S. Cl. .................. 384/450; 384/516; 384/544; 384/589
(58) Field of Classification Search .................. 384/450, 384/516, 544, 589
See application file for complete search history.

(56) References Cited

U.S. PATENT DOCUMENTS 6,036,371 A * 3/2000 Onose .................. 384/494
7,104,695 B2   9/2006 Shevket

FOREIGN PATENT DOCUMENTS

| JP | 57-6125 | 1/1982 |
| JP | 57-51019 | 3/1982 |
| JP | H10-181304 | 7/1998 |
| JP | H11-91308 | 4/1999 |
| JP | 2004-108449 | 4/2004 |
| JP | 2004108449 | * 4/2004 |

* cited by examiner

*Primary Examiner*—Jimmy G Foster

(57) ABSTRACT

A hub bearing assembly comprising a hub having a radially outwardly directed flange at one axial end for mounting the wheel of a vehicle, an outer ring having axially spaced raceways and a plurality of rolling elements arranged in two rows in the annular space between the outer ring and the hub, the diameter of the pitch circle of the outboard row of rolling elements adjacent said flange being greater than the diameter of the pitch circle of the rolling elements in the inboard row.

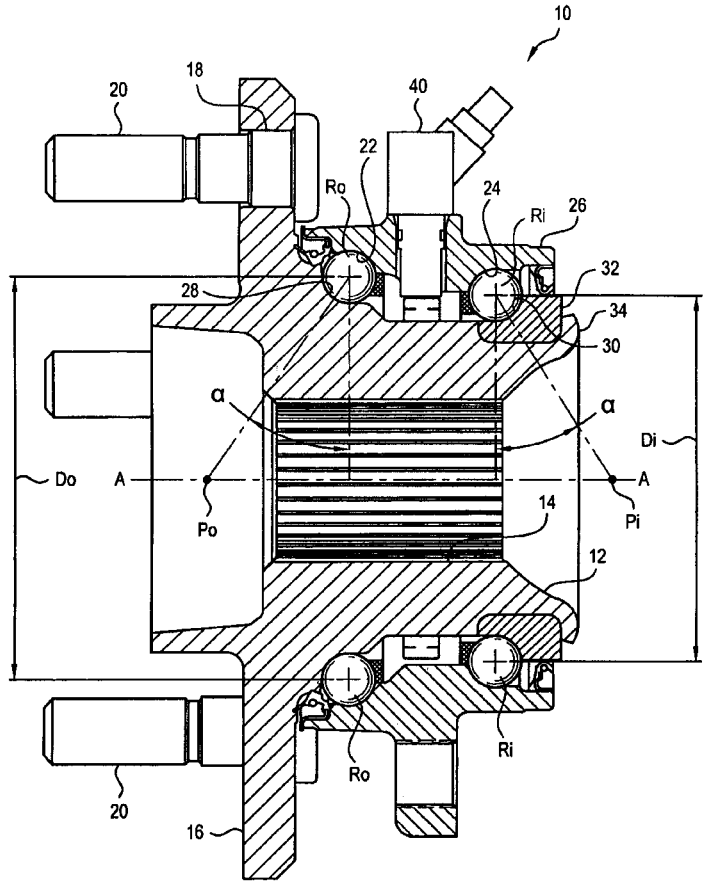

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 6 and 8-10 is confirmed.

Claims 1-4 were previously cancelled.

Claims 5 and 7 are determined to be patentable as amended.

5. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) *by a distance of at least 5 mm* wherein the contact angles of the inner and outer rows of rolling elements intersect the rotational axis (A-A) of the hub (12) at pressure centers (Pi, Po) which lie outside the flange (16) at the outboard end of the hub assembly and outside the hub (12) at the inboard side to define a wide pressure base between the pressure centers (Pi, Po) providing higher moment stiffness, better distribution of the load on the bearings and reducing the moment acting on the flange (16).

7. A hub bearing assembly comprising a hub (12) having a radially outwardly directed flange (16) at one axial end for mounting the wheel of a vehicle, an outer ring (26) having axially spaced raceways (22, 24) and a plurality of rolling elements arranged in two rows (Ri, Ro) in the annular space between the outer ring (26) and the hub (12), the diameter (Do) of the pitch circle of the outboard row (Ro) of rolling elements adjacent said flange (16) being greater than the diameter (Di) of the pitch circle of the rolling elements in the inboard row (Ri) *by a distance of at least 5 mm* wherein the contact angle of the outer row of rolling elements intersects the rotational axis (A-A) of the hub (12) at a pressure center (Po) which lies outside the flange (16) at the outboard end of the hub assembly to define a wide pressure base between the pressure centers (Pi, Po) providing higher moment stiffness, better distribution of the load on the bearings and reducing the moment acting on the flange (16).

* * * * *